United States Patent [19]
Haas

[11] 3,858,775
[45] Jan. 7, 1975

[54] MINI BIKE CARRIER

[76] Inventor: Lawrence J. Haas, 124 N. 16th Ave., West Bend, Wis.

[22] Filed: Nov. 12, 1973

[21] Appl. No.: 415,290

Related U.S. Application Data

[63] Continuation-in-part of Ser. No. 144,980, July 8, 1971, abandoned.

[52] U.S. Cl. .... 224/42.03 B, 224/42.42 R, 403/115
[51] Int. Cl. .............................................. B60n 9/10
[58] Field of Search .......... 224/42.03 B, 42.03 R, 224/42.03 A, 42.45 R, 29 R, 42.43, 42.12, 42.32, 42.42 R, 42.6, 42.07; 280/150 F, 474; 403/115

[56] References Cited
UNITED STATES PATENTS

| | | | |
|---|---|---|---|
| 2,712,945 | 7/1955 | Peterson | 280/474 |
| 3,062,563 | 11/1962 | Pearce | 280/474 |
| 3,210,103 | 10/1965 | Montgomery | 287/21 |
| 3,240,406 | 3/1966 | Logan | 224/42.03 B |

FOREIGN PATENTS OR APPLICATIONS

| 93,243 | 11/1938 | Sweden | 224/42.03 B |

Primary Examiner—Robert J. Spar
Assistant Examiner—Jerold M. Forsberg
Attorney, Agent, or Firm—Henry C. Fuller, Jr.

[57] ABSTRACT

A carrying device for small two-wheeled vehicles such as mini bikes includes a clamp for securing the carrier to a conventional trailer hitch. The clamp includes an upper plate having an upwardly concave socket surface complementary to the curvature of the ball hitch and a lower socket which receives the ball hitch nut. The upper and lower plates are clamped together by a pair of bolts. Support arms extending upwardly from the upper plate include cantilevered portions for supporting a vehicle or the like.

1 Claim, 2 Drawing Figures

PATENTED JAN 7 1975  3,858,775

MINI BIKE CARRIER

CROSS REFERENCE TO RELATED APPLICATION

This application is a continuation-in-part application of Ser. No. 144,980, filed July 8, 1971, and now abandoned.

SUMMARY OF THE INVENTION

The vehicle carrier of the invention is adapted to clamp on a conventional ball hitch used for trailers. Thus the rigidity of the hitch mounted on the vehicle provides sturdy support for the article carried. Two opposed plates are clamped on the ball hitch with the upper plate having a socket complementary to the ball for securely embracing the ball. The lower plate has an upwardly extending socket which is clamped against the base of the tow bar and around the nut and stud which secure the ball to the tow bar.

Inasmuch as the clamping arrangement is very secure, the vehicle can be supported on cantilevered arm portions rearwardly of the vehicle.

Further objects, advantages and features of the invention will become apparent from the following disclosure.

DRAWINGS

DETAILED DESCRIPTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
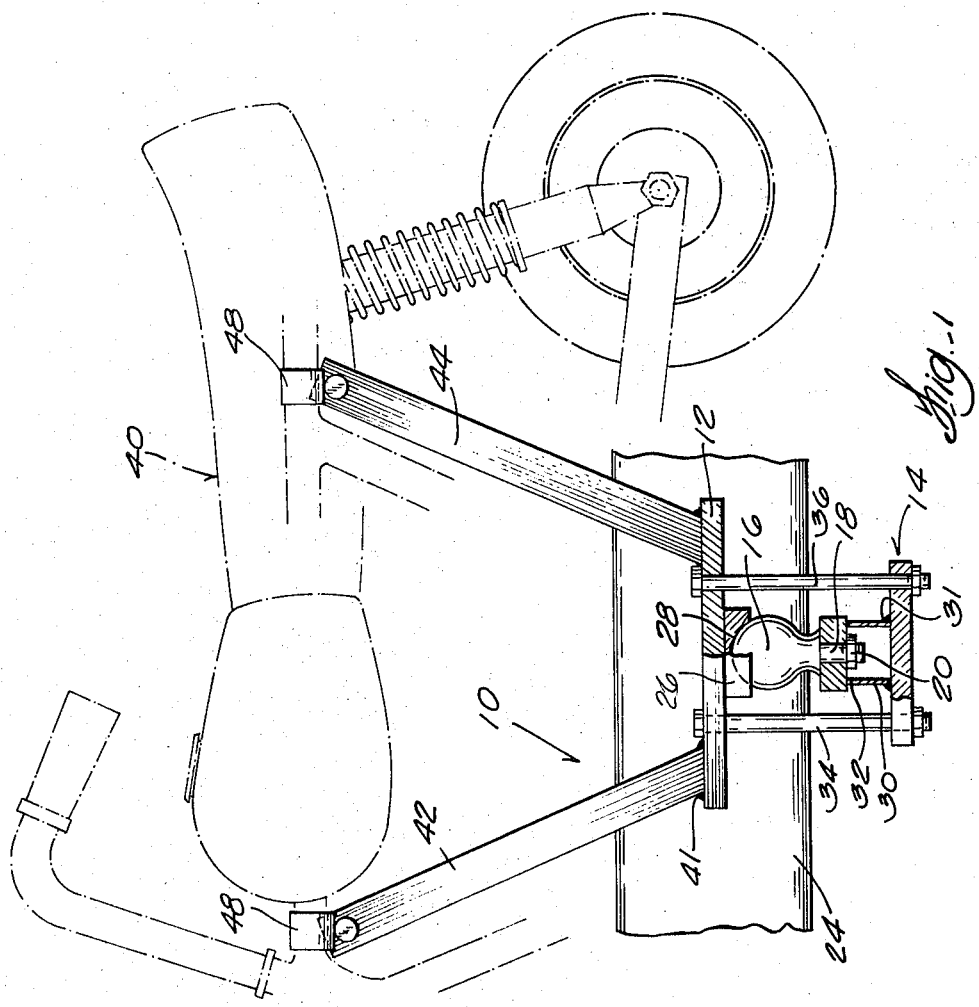
FIG. 1 is an elevational view viewed from the rear of the vehicle and fragmentarily showing a vehicle supported on the carrier.

In the drawings, FIG. 1 shows a small vehicle carrier for mini bikes or the like which is generally designated 10 which includes upper and lower clamping plates 12 and 14. The clamping plates 12 are adapted to secure the carrier to a conventional ball type hitch 16 which includes a threaded stud 18 and a nut 20 which secures the ball 16 to a tow bar 22 which is conventionally fastened to the rear of a vehicle 24. The upper clamping plate 12 includes a socket 26 fixed to the underside of plate 12 which has an upwardly concave surface 28 complementary to the curvature of the ball 16. The lower plate 14 includes an upstanding tube 30 which is desirably rectangular in cross section and welded to plate 14 at 31. The upper edge 32 of the member 30 orients the carrier on the ball hitch and prevents translatory displacement of the carrier about the ball.

A pair of bolts 34 and 36 extending through apertures in upper and lower plates 12 and 14 rigidly secure the carrier to the ball and tow bar 16 and 22. The ball 16 and socket 26 together with the sleeve 30 properly orients the plates and secures the carrier to tow bar when the bolts are tightened and clamps the upper plate against the ball and sleeve against the tow bar to prevent translatory displacement.

Figure 2:
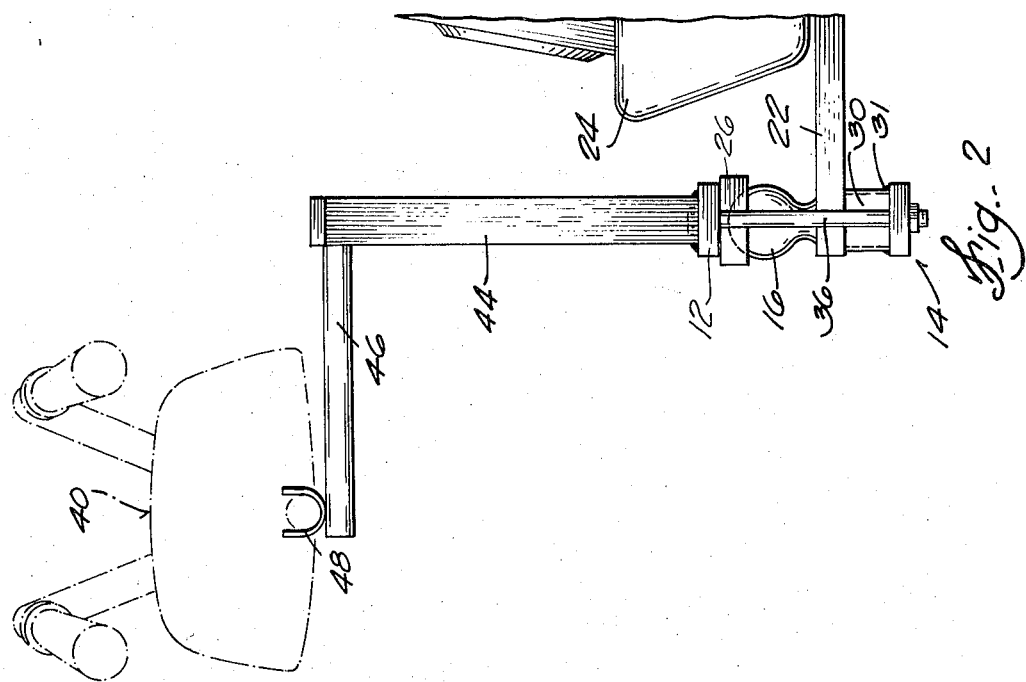
FIG. 2 is a side elevational view of the device shown in FIG. 1 and fragmentarily showing the tow vehicle to which the carrier is connected.

A mini bike or the like 40 is supported on the carrier by upwardly extending arms 42 and 44 which can be welded at 41 or otherwise secured to the plate 12. The arms 42 and 44 can diverge as shown in FIG. 1 to afford support at widely spaced points on the object being carried. The arms 42 and 44 include horizontal extending cantilevered portions 46 which extend rearwardly from the towed vehicle as shown in FIG. 2. The cantilevered arms 46 can be provided with U-shaped cradles 48 for receiving the tubular frame work of a vehicle.

What is claimed is:

1. In combination a trailer hitch having a tow bar and a ball said ball having a threaded shank projecting through an aperture in said tow bar, a nut on said shank, and a carrier for a two-wheeled vehicle or the like comprising upper and lower spaced clamping plates, said upper plate having a socket with a curvature complementary to the curvature of said ball hitch for receiving said ball hitch, said lower plate including an upstanding sleeve engagable with the undersurface of said tow bar, bolts extending through said upper and lower plates, for clamping said upper plate in contact with said ball hitch and said upstanding sleeve in said lower plate in contact with said tow bar, said sleeve receiving said shank and nut and support arms fastened to said upper plate and extending upwardly for supporting said vehicle.

* * * * *